(12) United States Patent
Lupke et al.

(10) Patent No.: US 7,311,509 B2
(45) Date of Patent: Dec. 25, 2007

(54) EXTERNALLY COOLED MOVING MOLD

(76) Inventors: Manfred A. A. Lupke, 92 Elgin Street, Thornhill, Ontario (CA) L3T 1W6; Stefan A. Lupke, 32 Vintage Lane, Thornhill, Ontario (CA) L3T 1X6

( * ) Notice: Subject to any disclaimer, the term of this patent is extended or adjusted under 35 U.S.C. 154(b) by 0 days.

(21) Appl. No.: 10/568,784

(22) PCT Filed: Aug. 16, 2004

(86) PCT No.: PCT/CA2004/001475
§ 371 (c)(1),
(2), (4) Date: Feb. 14, 2006

(87) PCT Pub. No.: WO2005/030463
PCT Pub. Date: Apr. 7, 2005

(65) Prior Publication Data
US 2007/0014884 A1   Jan. 18, 2007

(30) Foreign Application Priority Data
Oct. 1, 2003   (CA) .................................... 2444096

(51) Int. Cl.
*B29C 47/90* (2006.01)

(52) U.S. Cl. .................. 425/326.1; 425/171; 425/233; 425/369; 425/384

(58) Field of Classification Search ................ 425/171, 425/233, 326.1, 369, 384, 388, 392
See application file for complete search history.

(56) References Cited

U.S. PATENT DOCUMENTS

| 3,066,351 | A | * | 12/1962 | Schriner ................... 264/297.7 |
| 3,636,863 | A | * | 1/1972 | Woyden ....................... 100/49 |
| 4,439,130 | A | * | 3/1984 | Dickhut et al. ............. 425/388 |
| 5,057,171 | A | * | 10/1991 | Horner et al. ........... 156/89.12 |
| 5,164,204 | A | * | 11/1992 | Weppert et al. ............. 425/336 |
| 5,525,289 | A | * | 6/1996 | Lupke et al. ................ 264/508 |
| 2003/0151172 | A1 | * | 8/2003 | Floyd et al. ................. 264/572 |

* cited by examiner

*Primary Examiner*—Robert Davis
*Assistant Examiner*—Joseph Leyson

(57) ABSTRACT

A molding apparatus includes a moving mold for shaping molten plastic into product made within the moving mold. The moving mold is surrounded by an air block housing to define a cooling chamber exteriorly around the moving mold. At least one heat exchanger is located within the cooling chamber. The heat exchanger provides cooling air which is contained by the housing within the cooling chamber to act on and provide cooling of the moving mold.

17 Claims, 3 Drawing Sheets

EXTERNALLY COOLED MOVING MOLD

FIELD OF THE INVENTION

The present invention relates to product molding apparatus of the type using mold block sections to form a moving mold.

BACKGROUND OF THE INVENTION

It is known in the molding business and particularly in the pipe molding business to use moving molds in forming the pipe for product. These moving molds are formed by mold block sections that mate with one another to define a mold block tunnel. Molten plastic is fed from an extruder into the moving mold tunnel. The mold block sections then separate from one another along what is known as a return run to move back to an up stream position for reentering the moving mold. The plastic product or pipe emerges from the downstream end of the moving mold where the mold block sections separate from one another before moving to their return path.

As the mold block sections move in a downstream direction in the moving mold tunnel they pick up a large amount of heat from the molten plastic. This is detrimental to the cooling and shaping of the product in the moving mold. As such, it is important to attempt as much as possible to cool the mold block sections. Typically, this is done while the mold block sections are mated with one another through the moving mold by subjecting them to different cooling mediums. One cooling medium according to conventional practice may be in the form of chilled water run through or onto the surfaces of the mold block sections. Another cooling medium is cooling air run through the mold tunnel.

In the case where water is used to cool the mold block sections there are generally problems created in controlling and drawing the water flow In the case of introducing cooling air directly into the mold tunnel there are problems associated with the location for the introduction of the air to get it into the mold tunnel. Further there is a problem with cooling of the actual extrusion equipment through which the air is passed to get the air into the interior of the mold tunnel.

SUMMARY OF THE PRESENT INVENTION

The present invention provides a molding apparatus having a moving mold which is subjected to cooling air outwardly around the moving mold. This eliminates the problems described above.

More particularly, the molding apparatus of the present invention includes a moving mold for shaping molten plastic into product made within the moving mold. The moving mold is surrounded by an air block housing to define a cooling chamber exteriorly around the moving mold. A source of cooling air provides the cooling medium which is contained by the housing within the cooling chamber to act on and provide cooling of the moving mold.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION IN WHICH

Figure 1:
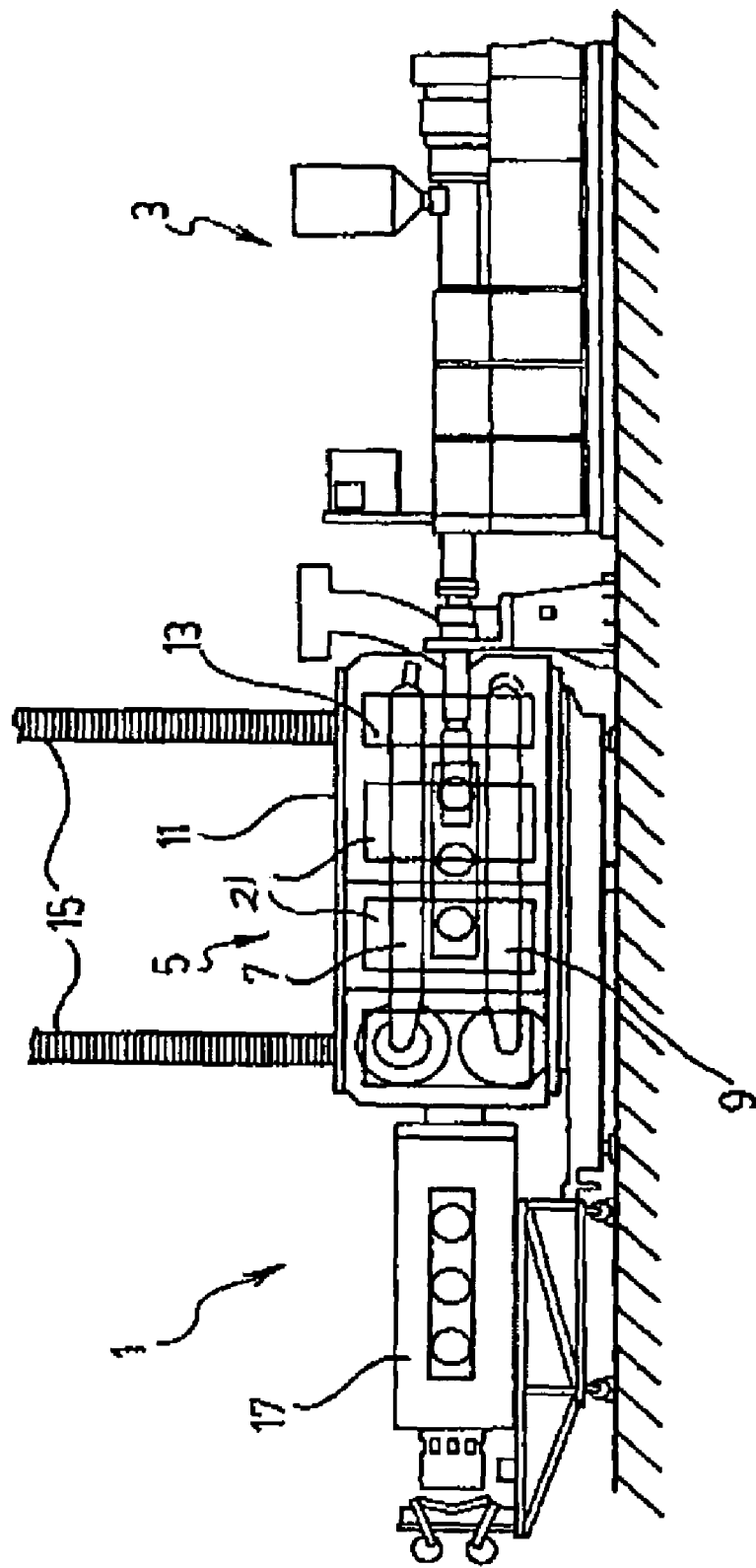
FIG. 1 is a side view of a complete molding apparatus according to a preferred embodiment of the present invention.

FIG. 1 shows a pipe forming apparatus generally indicated at 1. The entirety of this apparatus includes extrusion equipment 3 at the upstream end of the apparatus. This extrusion equipment provides molten plastic which is fed to a molding region generally indicated at 5. Plastic product and in this case plastic pipe is shaped from the molten plastic within the molding region. The plastic pipe then leaves the molding region for further setting or hardening within a cooler 17 located downstream of the molding region 5.

Figure 2:
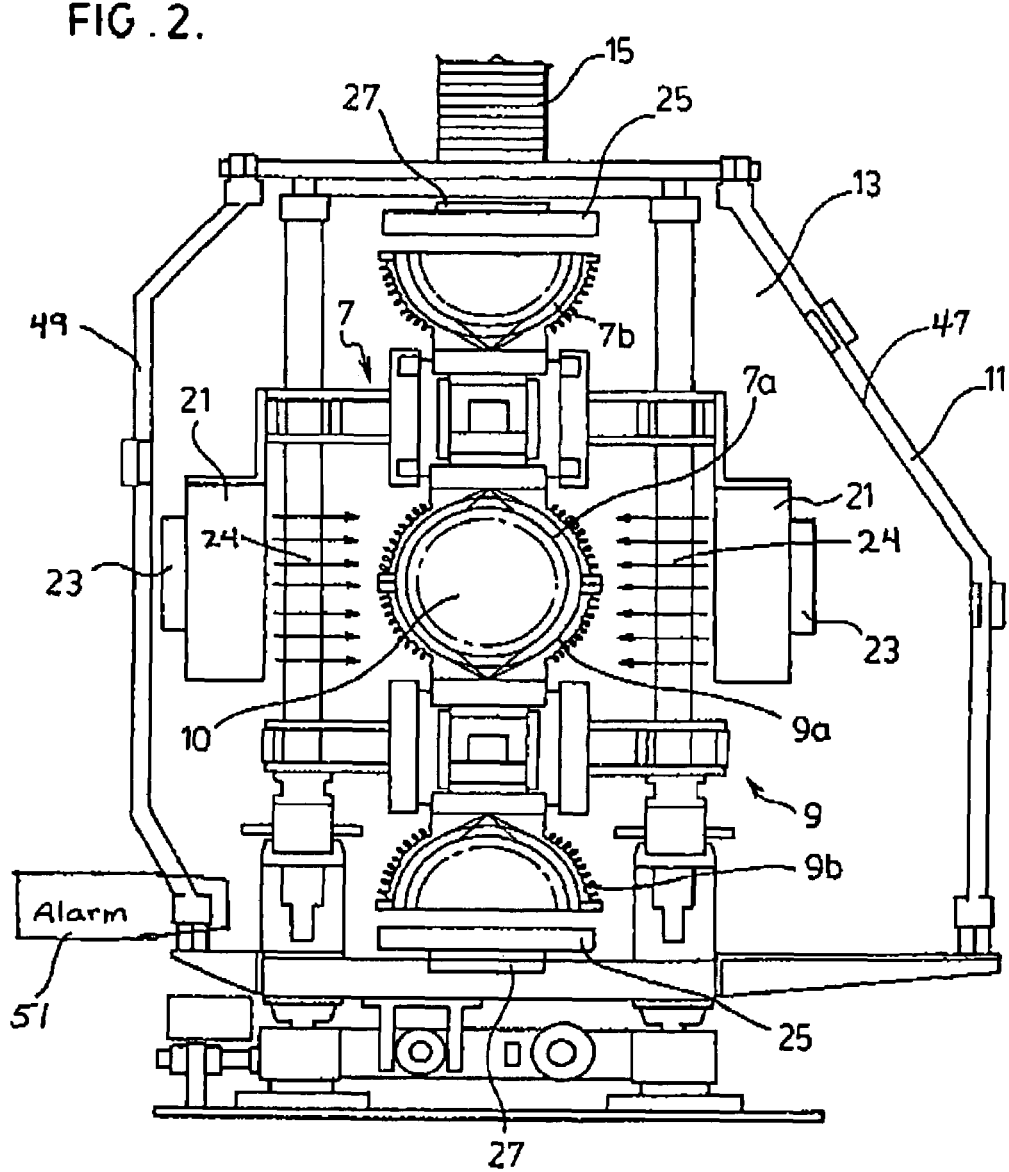
FIG. 2 is a sectional view through the moving mold region of the apparatus of FIG. 1.

The molding region itself comprises a pair of endless tracks of mold block sections 7 and 9. These mold block sections as better seen in FIG. 2 of the drawings meet to form a moving mold having a mold tunnel 10. The mold block sections then separate from one another along a return run before reentering the moving mold tunnel. In FIG. 2, mold block sections 7a from the upper track 7 mate with mold block sections 9a from the lower track 9 in forming the moving mold tunnel. FIG. 2 also shows mold block sections 7b from the upper track and mold block sections 9b from the lower track in their open configuration as they move along their respective return paths.

Figure 3:
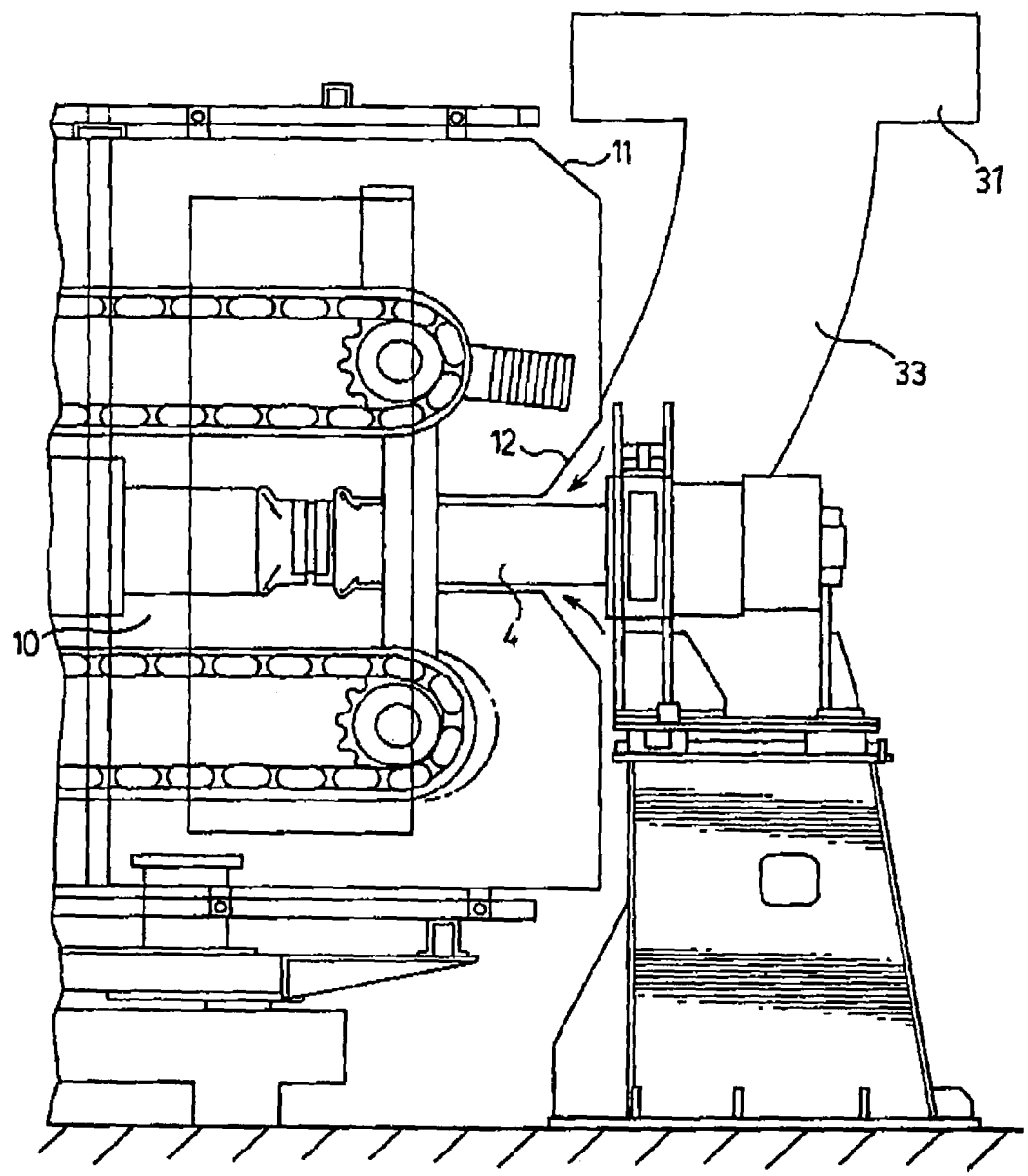
FIG. 3 is an enlarged sectional view through the upstream end of the moving mold region of FIG. 1.

FIG. 3 of the drawings shows that the die equipment includes die tooling 4 which feeds the molten plastic into the moving mold tunnel 10 where the plastic is actually shaped or formed into a pipe body.

Returning to FIG. 2 of the drawings, it will be seen that the moving mold comprising both the forward run and the return run for each of the tracks 7 and 9 is surrounded by an air block housing 11. This air block housing as described later in detail defines a cooling chamber 13 exteriorly around the moving mold.

Cooling chamber 13 contains cooling air which is trapped within the cooling chamber to act on the exterior surfaces of the mold block sections as they move through mold tunnel 10. The same trapped air also acts on the interior surfaces of the mold block sections when the mold block sections are in an open configuration along a return run to the moving mold tunnel. More specifically, the cooling air acts on the exterior surfaces of mold block sections 7a and 9a and also acts on both the interior and the exterior surfaces of mold block sections 7b and 9b.

The cooling air can come from a number of different sources. These sources can be located either externally or internally of the air block housing. When the source of cooling is located externally of the housing it must be moved into the housing by air supply means such as ducting 15 shown in FIGS. 1 and 2.

The source of cooling air can either be a manufactured source of air or it can be ambient air when the apparatus is situated in a relatively cold weather climate. A blower could be used to move the air through the ducting from the supply source into the housing.

According to a preferred embodiment of the invention as shown in FIG. 2 of the drawings air cooling units are provided directly within chamber 13 surrounded by housing 11. The housing is preferably insulated to prevent heat loss through the housing. The housing can include sliding insulated access doors 47 and 49 as well as an alarm sensor 51 indicating opening of the access doors.

The cooling units such as heat exchangers 21 may for example be located to either side of the moving mold tunnel. Blowers 23 help to produce a heat exchange between the cooling units and the exterior surface of the moving mold tunnel. Further cooling units such as heat exchangers 25 with associated blowers 27 may be provided above and below the open mold block sections 7b and 9b along their return runs.

The above heat exchangers comprise any of numerous different types of refrigeration units to chill the air within the cooling chamber. This chilled air is then moved onto the various different surfaces of the mold block sections. The heated air coming off the mold block sections is in turn cooled by the heat exchangers. The air movement or turbulence within cooling chamber 13 enhances the cooling effect of the chilling or cooling air. This air is not allowed to escape the immediate vicinity of the mold block sections by virtue of it being entrapped within the air block housing 11.

As earlier described, die tooling 4 feeds to the mold tunnel 10. It enters the cooling chamber through mouth 12 of housing 11. This mouth closely surrounds the die tooling to inhibit as much as possible the escape of cold air from chamber 13.

As will be appreciated from the description immediately above, die tooling 4 is itself exposed to the cooling air within chamber 13. However, cooling of the die tooling is adverse to the operation of the extruder. As such, a heater 31 having a plenum 33 feeds hot air directly onto the exterior surface of die tooling 4 where the die tooling enters chamber 11. This hot air heating of the die tooling offsets the effect of the cooling air within the chamber on the die tooling.

The plastic pipe which leaves the molding region 5 of the apparatus will be in a much firmer or more setup condition than it would be with a conventional moving mold. This is because the mold sections themselves are kept much cooler than is normal practice. As such the mold block sections are able to much more easily absorb the heat from the plastic for the setting of the shape of the pipe in the molding region.

FIG. 1 as noted above also shows a product cooler 17 located inline with and downstream of mold tunnel 10. If this cooler is needed it provides additional setting of the pipe outside of the mold region. In accordance with a preferred embodiment of the invention cooler 17 is set up in a manner very similar to the actual mold region in that it may be provided with its own supply of cooling air contained within the housing of cooler 17. This cooling air is then trapped outwardly around and acts directly on the plastic of the pipe. This therefore provides an extremely rapid means for final cooling the pipe.

The drawings show the apparatus and in particular the moving mold as operating in a horizontal direction. The invention i.e., the surrounding of the moving mold by an air block housing which contains cooling air is equally applicable to a plastic product forming apparatus having a vertically orientated moving mold.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A molding apparatus (1) including a moving mold (10) for shaping molten plastic into product made within said moving mold (10), said moving mold includes opposed mold blocks which meet in a closed mold block configuration to define the moving mold in a forward run of said mold blocks with said mold blocks separating to an open configuration in a return run of said mold blocks, said moving mold (10) being surrounded by an air block housing (11) in said forward run and said return run of said mold blocks to define a cooling chamber (13) exteriorly around said moving mold (10), a source of cooling air (24), the cooling air (24) being contained by said housing (11) within said cooling chamber (13) to act on and provide cooling of said moving mold (10); said cooling chamber maintaining a trapped cooled air environment about said moving mold.

2. Apparatus (1) as claimed in claim 1 wherein the source of cooling air (24) comprises at least one cooling air unit (21, 25).

3. Apparatus (1) as claimed in claim 2 wherein said cooling unit (21, 25) is located internally of said air block housing (11).

4. Molding apparatus (1) as claimed in claim 3 including at least one blower (27) for circulating the cooled air (24) within said cooling chamber (13).

5. Apparatus as claimed in claim 2 wherein said cooling unit (21, 25) is located externally of said air block housing (11), said apparatus including ducting (15) from said unit (21, 25) to said air block housing (11) and a blower (27) for moving the cooled air from said cooling unit (21, 25) through said ducting into said air block housing (11).

6. Molding apparatus as claimed in claim 1 wherein said source of cooling air (24) comprises cooled ambient air externally of said cooling chamber (13), said apparatus including ducting (15) from said housing (11) to the source of cooling air.

7. Molding apparatus as claimed in claim 6 including blower means (15) to move the cooling air from said source through said ducting (15) into said cooling chamber (13).

8. Apparatus as claimed in claim 1 wherein said air block housing (11) is insulated to minimize heat loss of the cooling air (24) through said housing (11).

9. Apparatus as claimed in claim 8 including access doors (47, 49) through said housing to said moving mold (10), said access doors (47, 49) also being insulated.

10. Apparatus as claimed in claim 9 including an alarm (51) that indicates opening of said access doors (47, 49).

11. Apparatus as claimed in claim 1 including extruder die tooling feeding into said moving mold (10) at one end of said housing (11) and further including a heater for heating said die tooling to offset effect of the cooling air in said cooling chamber on the die tooling.

12. Apparatus as claimed in claim 1 wherein said moving mold (10) comprises a pipe corrugator (7, 9).

13. Apparatus as claimed in claim 1 wherein said moving mold (10) travels in a vertical direction through said cooling chamber (13).

14. Apparatus as claimed in claim 1 wherein said moving mold (10) travels in a horizontal direction through said cooling chamber (13).

15. Apparatus as claimed in claim 1 including a product cooler (17) downstream of said air block housing (11), said product cooler (17) being inline with and receiving the plastic product from said moving mold (10) and comprising a cooler housing around the product, and a heat exchanger within said cooler housing, said heat exchanger in said cooler housing providing cooled air which is trapped within the cooler housing to act on the product after the product is released from the moving mold.

16. Apparatus as claimed in claim 1 including a plurality of heat exchangers (21, 25) located within said cooling chamber (13), said plurality of heat exchangers (21, 25) including first and second heat exchangers located to opposite sides of said moving mold (10).

17. Apparatus as claimed in claim 1 wherein said apparatus including first and second heat exchangers (21) located to first and second sides of said moving mold (10) and directed at said mold block sections (7, 9) in the closed mold block configuration, and further includes third and fourth heat exchangers (25) to third and fourth sides of said moving mold and directed at said mold block sections (7, 9) in the open mold block section configuration.

\* \* \* \* \*